Dec. 30, 1947.　　　　E. PARKINSON　　　　2,433,706
WHEEL MOUNT FOR AIRCRAFT LANDING GEARS
Filed March 9, 1943　　　2 Sheets-Sheet 1
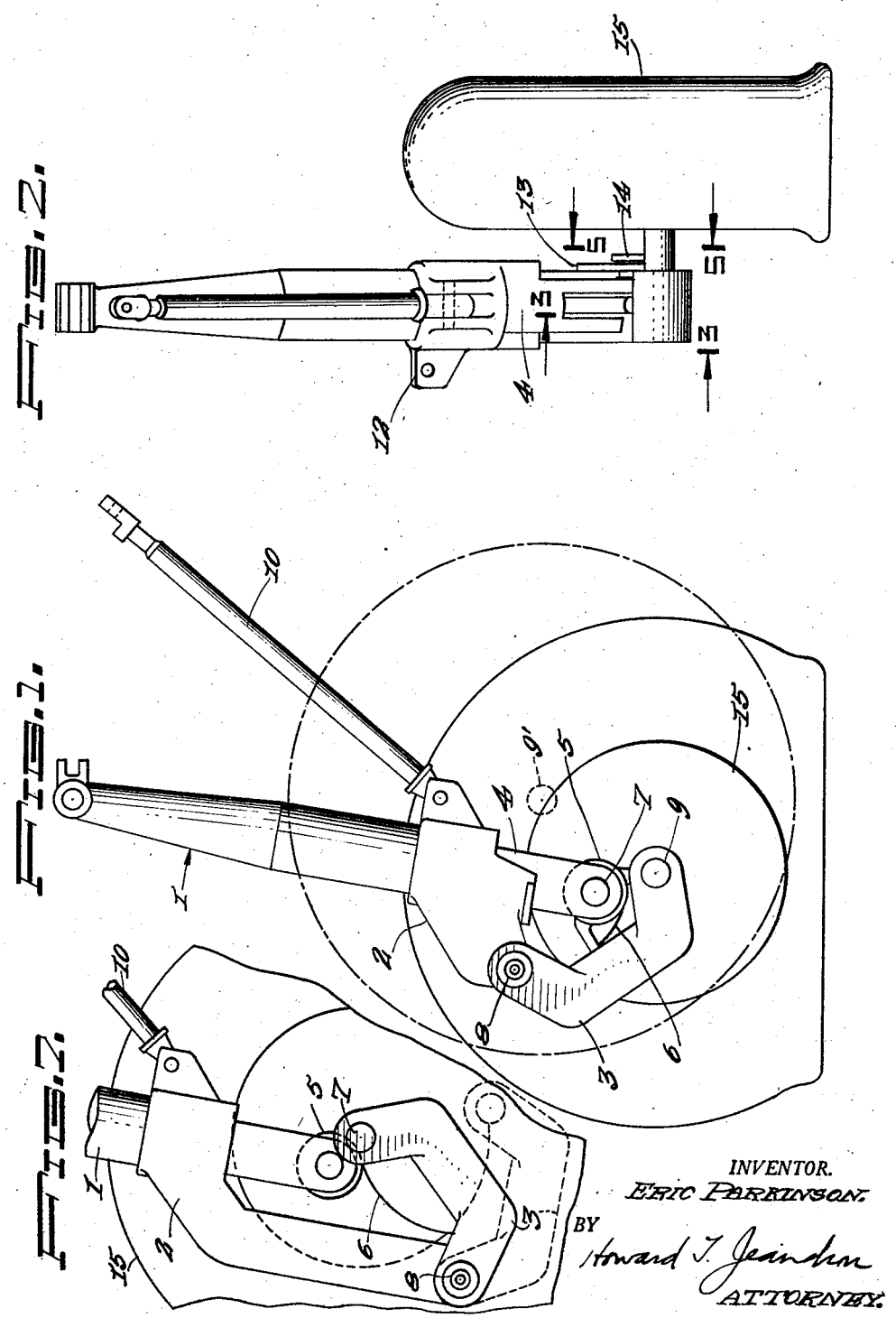
INVENTOR.
ERIC PARKINSON.
BY Howard J. Jeandron
ATTORNEY.

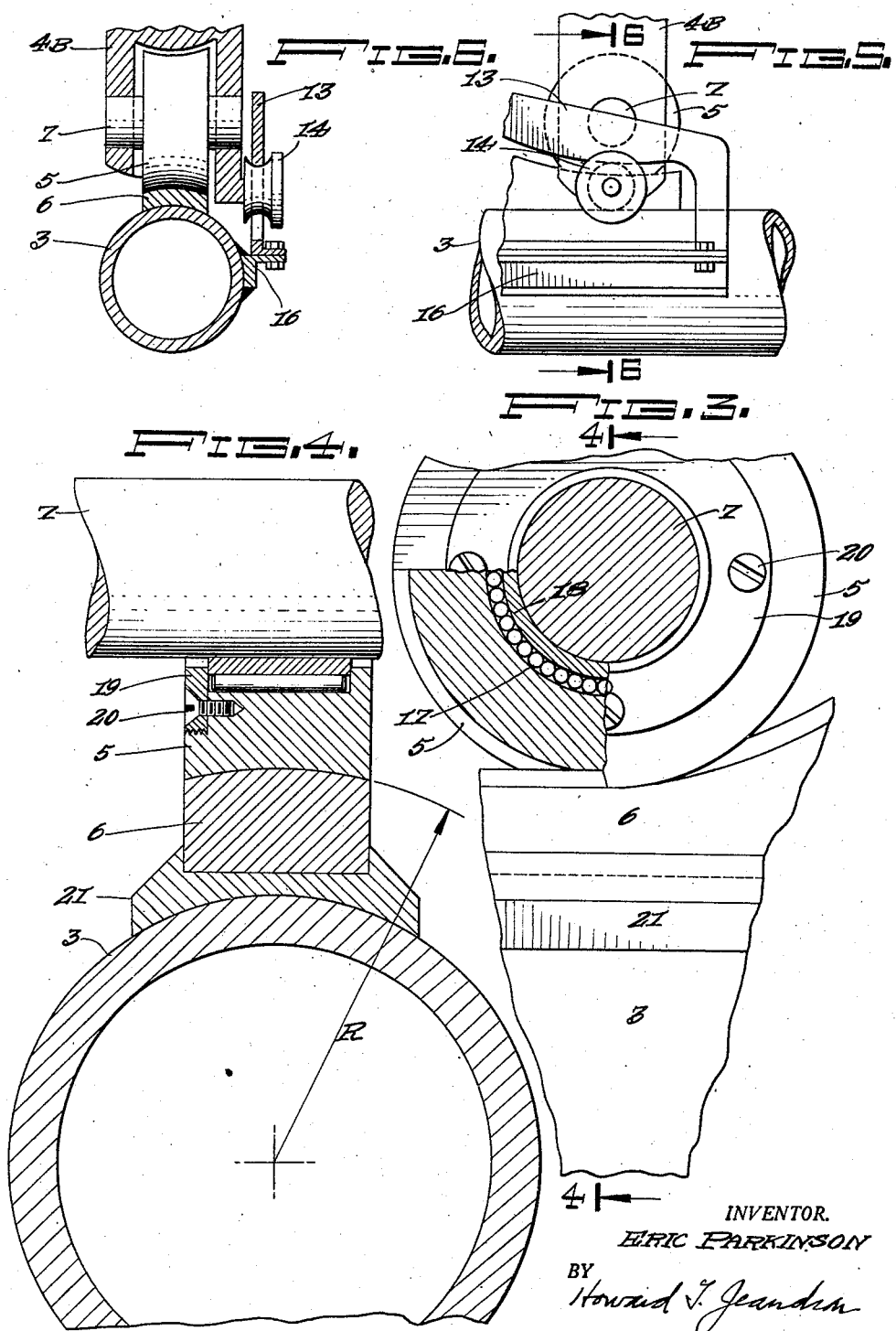

Patented Dec. 30, 1947

2,433,706

UNITED STATES PATENT OFFICE 2,433,706

WHEEL MOUNT FOR AIRCRAFT LANDING GEARS

Eric Parkinson, New York, N. Y.

Application March 9, 1943, Serial No. 478,561

8 Claims. (Cl. 244—104)

This invention pertains to aircraft landing gears, and more particularly, to the wheel mounts on the struts on which they are connected to the fuselage. Such struts generally include a member secured to the wheel and another secured to the fuselage, one of these members being slidably carried within the other. The structure also generally includes means for elastically supporting the weight of the aircraft and other means for absorbing the considerable shocks coincident with the takeoff and landing of the craft. In addition, particularly in case of a cantilever mounting of the wheel, further means are required to resist the torsional and bending stresses to which the mounting is subjected when the craft taxies on the ground.

The known devices have the shortcoming that the forces acting on the sliding members of the strut are not centered in the axis thereof. Consequently, there arise considerable lateral stresses to which the said members must resist.

It is an object of the present invention to devise a wheel mount which will avoid all lateral stresses on the sliding members while being well-suited to resist any torsional and bending stresses that may occur.

To that end, according to the present invention, the wheel is so mounted on a link secured to one of the members of the strut that it remains free of a limited vertical and horizontal movement. The link transmits all torsional and bending stresses to said member of the strut to which it is secured while being adapted to transmit only such stresses to the other member of said strut which are accurately centered in the axis of the same.

According to a feature of the present invention, the link is pivotally secured to the exterior member of the strut so that it can rock up and down with respect thereto.

According to a further feature, the interior member of the strut engages said link by means of a roller.

According to another feature, the surface of said link which is engaged by said roller has a particular curved structure so that the portion immediately adjacent the point or line of contact with said roller always includes a right angle with the strut axis.

To facilitate a clear understanding of the present invention, an embodiment thereof will be described below with reference to the accompanying drawings, in which Fig. 1 is a side elevational view of a wheel mount according to the present invention;

Fig. 2 is a rear elevational view, of the same wheel mount;

Fig. 3 is a partial view taken along lines 3—3 of Fig. 2;

Fig. 4 is a cross-sectional view taken along line 4—4 of Fig. 3;

Fig. 5 is a partial view, taken along line 5—5 of Fig. 2;

Fig. 6 is a cross-sectional view, along line 6—6 of Fig. 5; and

Fig. 7 is a diagrammatic view illustrating an alternate form of the cam-face for the link of the wheel mount.

Referring particularly to Figs. 1 and 2, a strut leg 1 is secured at 11 to the fuselage of an aircraft. Rigid with leg 1 is a bracket 2, one end of link 3 is pivoted at 8 to ankle 2 while the other end is secured to the axle strut 9 of wheel 15. Piston 4 is slidably arranged in leg 1 and adapted resiliently to support the weight of the craft and to absorb shocks to which the strut may be subjected.

Rigid with link 3 is a cam-face 6 on which the head of piston 4 rolls by means of a roller 5 secured thereto by a pin 7.

A side strut 10 may be secured to ankle 2 at 12 for rigidity.

In operation, link 3 may rock up and down about pivot 8. When the craft is balanced on the ground wheel 15 and axle 9 will assume the position shown in dotted lines at 9' and 15', respectively in Fig. 1. In the course of these rocking movements, roller 5 rolls back and forth on cam-face 6. Due to the particular curvature of face 6, the roller is always supported on a tangential line perpendicular to the strut axis. The required curvature of face 6 can be determined by computation and if face 6 and the surface of roller 5 are finished with the necessary accuracy, all appreciable lateral stresses on piston 4 can be eliminated.

Obviously, all appreciable torsional and bending stresses which may act on wheel 15 are resisted by link 3 and bracket 2, the stresses that are not eliminated are compensated for by the roller 5 being concave on its face.

To facilitate the absorbing of recoil shocks, an auxiliary cam 13 may be provided on link 3 by means of a bracket 16, and an auxiliary roller 14, associated with cam 13, on piston 4 (Figs. 2 and 6).

Further details of the described embodiment are the manner of mounting roller 5 on pin 7, by means of bearings 17, of which the inner race 18 is slidably supported by pin 7. Bearings 17 are positioned by an annular retainer 19 threadably secured to roller 5 and locked in position by screws 20. Fig. 4 shows at 21 the support of cam-face 6 on link 3.

Fig. 7 has been added to show the effect of mounting the wheel center 7 higher than the pivotal mounting 8. This gives the cam 6 a convex shape rather than a concave shape, but operates similar to that indicated in the other views. Its curvature would be determined by the same formula as the concave cam 6 indicated in Figs. 1 and 3.

The foregoing description is not intended to limit the present invention which extends to all changes, modifications and equivalents within the scope of the appended claims.

What is claimed:

1. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a cam face thereon, said piston member having a roller on its outer end which bears on said cam face of said link member and rolls thereon, the shock absorber being secured to an aircraft, a landing wheel connected to the link member, said cam face on said link being constructed and arranged to engage said roller in a manner such that the transmission of force from such element to the piston member is always in the direction of the axis of the shock absorber.

2. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a cam face thereon, said piston member having a roller on its outer end which bears on said cam face and rolls thereon, the shock absorber being secured to an aircraft, a landing wheel being secured to the said link member, said cam face on said link being constructed and arranged to engage said roller in a manner such that the transmission of all forces from such elements to the piston member are always in the direction of the axis of the shock absorber.

3. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a cam face thereon, said cam face having a preformed curvature, said piston member having a roller on its outer end which bears on said cam face and rolls thereon, the shock absorber being secured to an aircraft, a landing wheel being secured to the said link member, said cam face on said link being constructed and arranged to engage said roller in a manner such that the transmission of force from such element to the piston member is always at a point where the tangent to the cam is normal to the shock absorber axis.

4. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a rounded cam face thereon, said piston member having a roller on its outer end which is formed with a curvature to match said cam face, said roller bearing on said cam face, the shock absorber being secured to an aircraft, a landing wheel being secured to the said link member, said cam face on said link being constructed and arranged to engage said roller in a manner such that the transmission of any torsional force from such element to the piston member is always in the direction of the axis of the shock absorber.

5. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a cam face thereon, said piston member having a roller on its outer end which bears on said cam face of said link member and rolls thereon, an auxiliary cam face rigid with said link but facing in opposite relation, and an auxiliary roller mounted on said piston outside of said first roller, said cam face on said link being constructed and arranged to engage said roller in a manner such that the transmission of force from such element to the piston member is always in the direction of the axis of the shock absorber, and said auxiliary cam face on said link being constructed and arranged to engage said auxiliary roller in an opposite direction to said first cam and roller, in a manner such that the transmission of force from such element to the piston member is always opposite to the first mentioned force but in the direction of the axis of the shock absorber.

6. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a convex shaped cam face thereon, said piston member having a roller on its outer end which bears on said cam face of said link member and rolls thereon, the shock absorber being secured to an aircraft, a landing wheel connected to the link member, said cam face on said link member constructed and arranged to engage said roller in a manner such that the transmission of any lateral force from such element to the piston member will be resolved in the direction of the axis of the shock absorber.

7. Wheel mount for aircraft landing gears which comprises a shock absorber strut composed of an outer casing and a reciprocating piston member within, a supporting means rigidly attached to the casing of said shock absorber and a link member pivotally attached to said supporting member, said link member having a concave shaped cam face thereon, said piston member having a roller on its outer end which bears on said cam face of said link member and rolls thereon, the shock absorber being secured to an aircraft, a landing wheel connected to the link member, said cam face on said link member engaging said roller of said piston member being constructed and arranged to engage said roller in a manner such that the transmission of axial forces in one direction from such element to the piston member and the transmission of all lateral or other forces are always in the direction of the axis of the shock absorber.

8. Wheel mount for aircraft landing gears which comprises a shock absorber strut composed of an outer casing and a reciprocating piston member within, a supporting member rigidly attached to the casing of said shock absorber and a link member pivotally attached to said supporting member, said link member having a cam face thereon, said piston member having a roller on its outer end which bears on said cam face of said link member and rolls thereon, the shock absorber being secured to an aircraft, a landing wheel connected to the link member, said cam face on said link being constructed and arranged to engage said roller in such a manner that the transmission of force from the cam face to the piston member is always at a point where the tangent to the cam is normal to the shock absorber axis.

ERIC PARKINSON.

REFERENCES CITED

The following references are of record in the file of this patent:

UNITED STATES PATENTS

| Number | Name | Date |
| --- | --- | --- |
| 2,279,447 | Cowey | Apr. 14, 1942 |
| 2,324,281 | Cowey | July 13, 1943 |